United States Patent
Sawa (10) Patent No.: US 7,567,299 B2
(45) Date of Patent: Jul. 28, 2009

(54) METHOD AND DEVICE OF FRAME-CYCLIC NOISE REDUCTION

(75) Inventor: Kazuki Sawa, Osaka (JP)

(73) Assignee: Panasonic Corporation, Osaka (JP)

( * ) Notice: Subject to any disclaimer, the term of this patent is extended or adjusted under 35 U.S.C. 154(b) by 578 days.

(21) Appl. No.: 10/550,894

(22) PCT Filed: Jan. 28, 2005

(86) PCT No.: PCT/JP2005/001624

§ 371 (c)(1),
(2), (4) Date: Sep. 27, 2005

(87) PCT Pub. No.: WO2005/074254

PCT Pub. Date: Aug. 11, 2005

(65) Prior Publication Data

US 2006/0192896 A1 Aug. 31, 2006

(30) Foreign Application Priority Data

Jan. 30, 2004 (JP) ............................ 2004-022906

(51) Int. Cl.
*H04N 5/52* (2006.01)
(52) U.S. Cl. .................................... 348/607
(58) Field of Classification Search ............... 348/607, 348/606, 615, 618, 625, 678, 679, 683
See application file for complete search history.

(56) References Cited

U.S. PATENT DOCUMENTS

| | | | |
|---|---|---|---|
| 5,333,054 A * | 7/1994 | Tanaka et al. ............... | 348/666 |
| 6,417,835 B1 | 7/2002 | Otobe et al. | |
| 6,542,202 B2* | 4/2003 | Takeda et al. ............... | 348/678 |
| 7,209,182 B2* | 4/2007 | Kawabata et al. ........... | 348/607 |
| 2001/0050956 A1* | 12/2001 | Takeshima ............. | 375/240.16 |
| 2002/0190925 A1 | 12/2002 | Awamoto et al. | |
| 2005/0002570 A1* | 1/2005 | Clark et al. ................. | 382/199 |

FOREIGN PATENT DOCUMENTS

| | | |
|---|---|---|
| EP | 1 058 229 | 12/2000 |
| JP | 6-225178 | 8/1994 |
| JP | 10-039830 | 2/1998 |
| JP | 2001-036770 | 2/2001 |
| JP | 2001-255863 | 9/2001 |
| JP | 2002-229504 | 8/2002 |
| JP | 2003-177708 | 6/2003 |
| JP | 2003-348383 | 12/2003 |

OTHER PUBLICATIONS

Supplementary European Search Report issued Nov. 11, 2008 in corresponding patent Application No. EP 05-70-4384.
Takahiko Fukinuki et al, "Multi-dimensional TV Signal Processing," p. 190, Nov. 15, 1988.

* cited by examiner

*Primary Examiner*—Paulos M Natnael
(74) *Attorney, Agent, or Firm*—Wenderoth, Lind & Ponack, L.L.P.

(57) ABSTRACT

A frame-cyclic noise reduction device of an image display device, in which one field is divided into a plurality of sub-fields, and turned-on sub-fields are properly combined to provide an image with gradation. The noise reduction device detects an area where an edge portion of an image becomes unclear, i.e., where sub-field fuzziness becomes worse, and controls a cyclic amount for the area in which sub-field fuzziness becomes worse so as to be different from that for another area, thereby decreasing noise.

3 Claims, 12 Drawing Sheets

FIG. 1A

Ascending coding

FIG. 1B

Descending coding

METHOD AND DEVICE OF FRAME-CYCLIC NOISE REDUCTION

This application is a U.S. National Phase Application of PCT International Application PCT/JP2005/001624.

TECHNICAL FIELD

The present invention relates to a method and device of frame-cyclic noise reduction employed for an image display device in which one field is divided into a plurality of sub-fields, and turned-on sub-fields are properly combined to provide image with gradation.

BACKGROUND ART

Figure 1A:
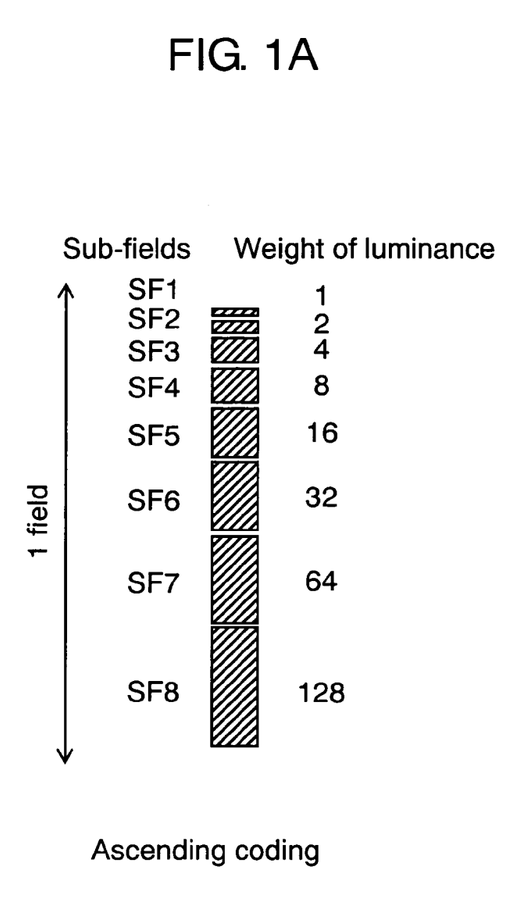
FIG. 1 shows examples of arrangement of the sub-fields in the sub-field method.
Figure 1B:
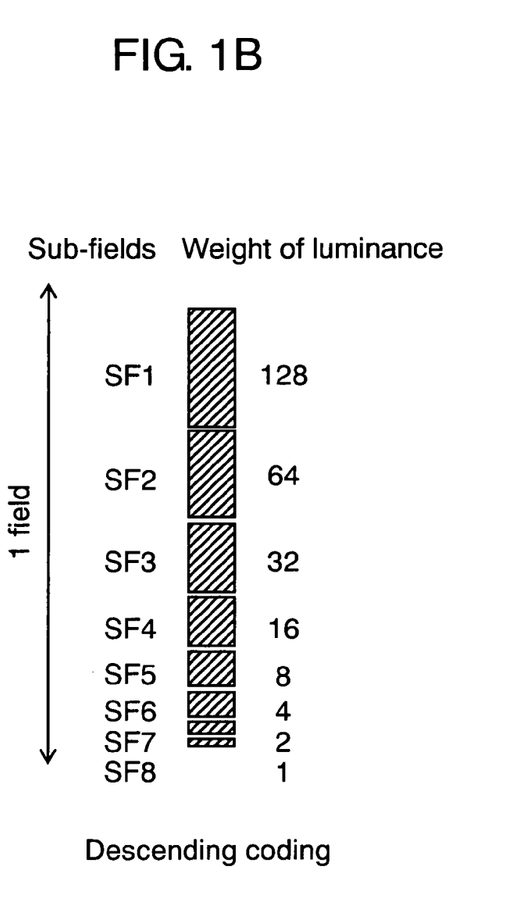

In a multi-leveled gradation display with the use of an image display device employing a two-valued display method, such as a display device with a plasma display panel, a sub-field method has conventionally been used. In the sub-field method, one field is divided into a plurality of sub-fields each of which has a predetermined weight of luminance. Gradation display is obtained by controlling turn-on/off of cells for each sub-field. For example, to achieve 256-level gray scale, one field is divided into 8 sub-fields. In this case, weight of luminance assigned to each sub-field is 1, 2, 4, 8, 16, 32, 64, and 128. When an 8-bit digital signal comes into the device having the above-described sub-fields, each bit of the incoming signal is assigned, in the order of the least significant bit, to the eight sub-fields. The 256 levels are obtained by turning the cells ON in combinations of the eight sub-fields. The luminance provided by the 8 sub-fields are visually accumulated in the eyes, a viewer sees half tones on the display (for example, see Plasma Display Handbook, pp. 165-177, Heiju Uchiike and Shigeo Mikoshiba, Kogyo Chousa Kai Shuppan). The arrangement of the eight sub-fields in one field has a specific limitation; the eight sub-fields may be arranged in the order of increasing the weight of luminance (hereinafter referred to as an ascending coding), as shown in FIG. 1A, or in reverse, they may be arranged in the order of decreasing the weight of luminance (hereinafter, a descending coding), as shown in FIG. 1B.

Figure 2:
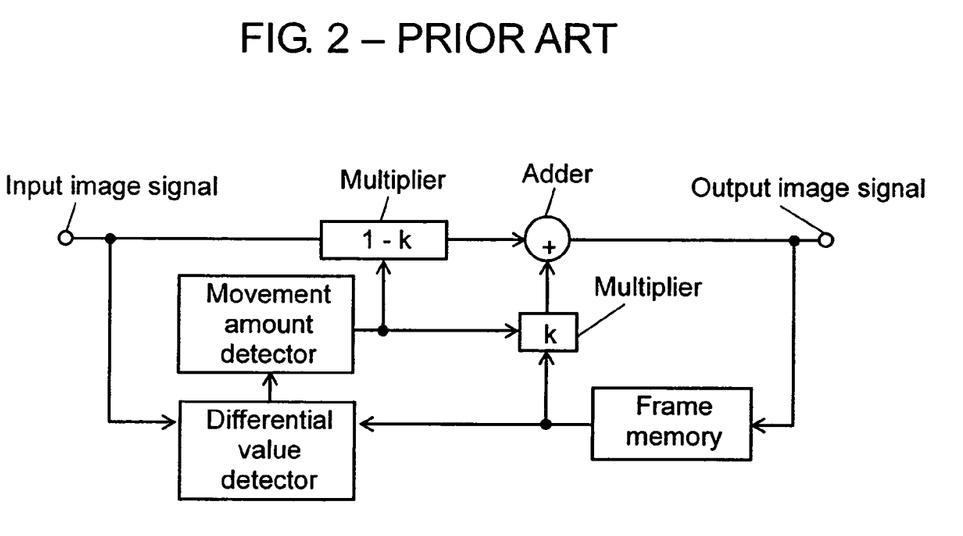
FIG. 2 is a circuit block diagram of a conventional frame-cyclic noise reduction device.

There have been many suggestions on a method and device capable of reducing noise in an image signal to improve the signal-to-noise (S/N) ratio. Such a method and device is also employed for an image display device having a plasma display panel (for example, see Japanese Patent Unexamined Publication No. 2001-36770); in particular, a frame-cyclic noise reduction method is well known as being highly effective (see Multidimensional Signal Processing for TV Image, p. 190, Takahiko Fukinuki, Nikkan Kogyo Shimbun). Generally, image signals have a strong autocorrelation between frames, whereas noise components contained in the image signals have no autocorrelation. Making use of the characteristics above, a frame-cyclic noise reduction device averages images by frame to reduce noise. However, a motion picture area has a weak autocorrelation between frames; when the averaging process is carried out on the motion picture areas, motion picture images themselves are also averaged. This introduces a fuzzy image or an after-image such as "tailing", degrading resolution. To address the problem above, a practical frame-cyclic noise reduction device is disclosed in, for example, Japanese Patent Unexamined Publication No. H06-225178. Prior to the averaging, the device detects a motion picture area from an image signal and controls a level of the averaging (hereinafter, a cyclic amount) according to the amount of movement of the detected area. FIG. 2 is a circuit block diagram illustrating a structure of a conventional frame-cyclic noise reduction device. The device detects a motion picture area from a differential signal between frames, and determines the cyclic amount according to an amount of movement; for a motion picture area, cyclic amount k is determined to be small ($0 \leq k \leq 1$) to suppress an after-image, on the other hand, for a still picture area, cyclic amount k is determined to be large to reduce noise.

According to the aforementioned device, however, reducing noise and suppressing a fuzzy contour of motion picture are in a trade-off relation. Therefore, it has been difficult to simultaneously improve both noise reduction and fuzziness suppressing since noise reduction is often traded off for suppressed fuzziness in a motion picture area, or vice versa.

In addition, an image display device employing the sub-field method often causes inconveniences; a viewer often sees a disturbance in gradation display when the eyes follow movement of an image, which is known as dynamic false contour. As another phenomenon, the edge portion of an image becomes blurred (hereinafter the phenomenon is referred to as sub-field fuzziness). For example, Japanese Patent Unexamined Publication No. 2002-229504 addresses the problems above.

Figure 3:
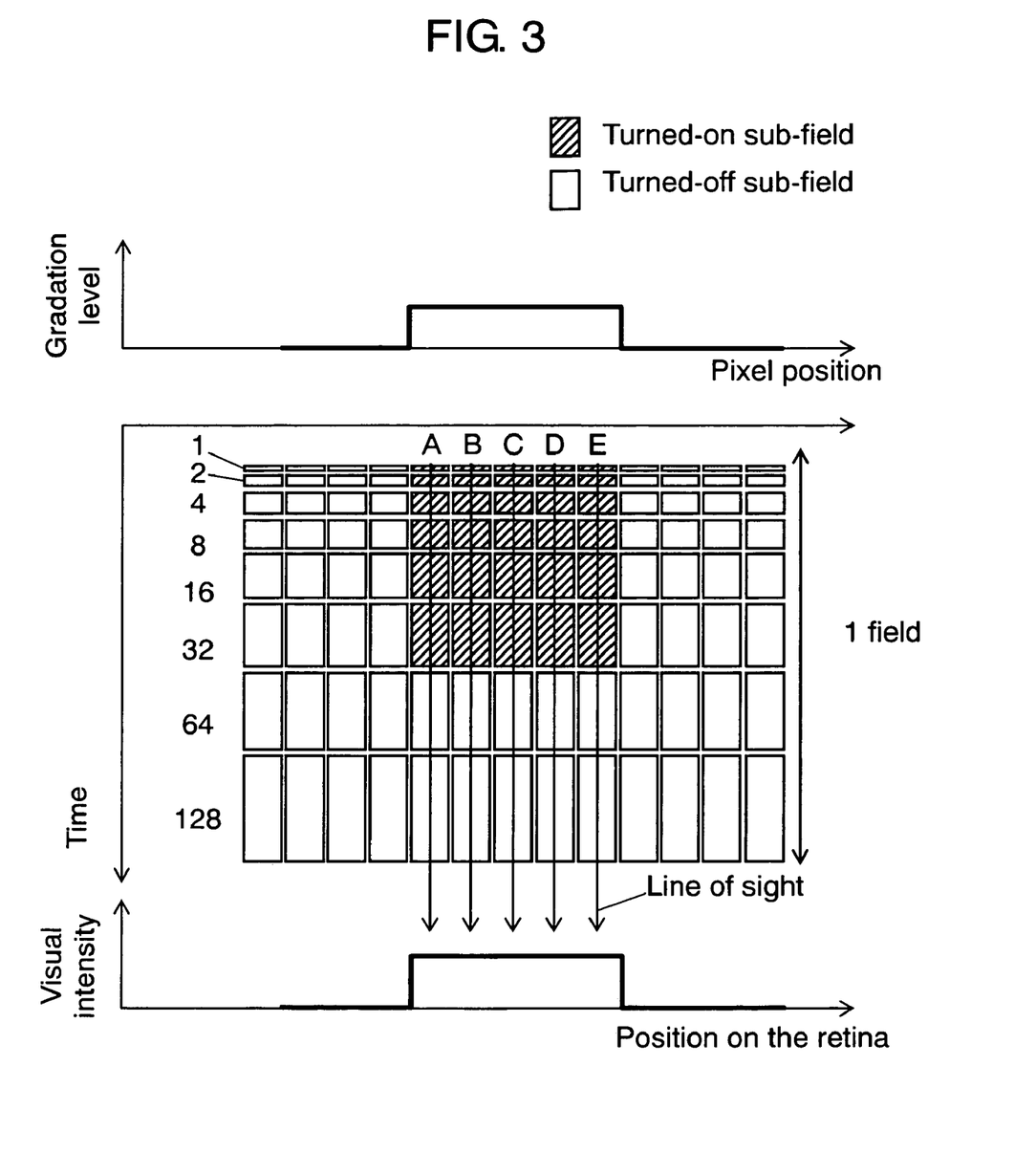
FIG. 3 shows a turned-on state of predetermined sub-fields in a still picture display and distribution of visible intensity on the retina of the eyes when a viewer sees the still picture.
Figure 4:
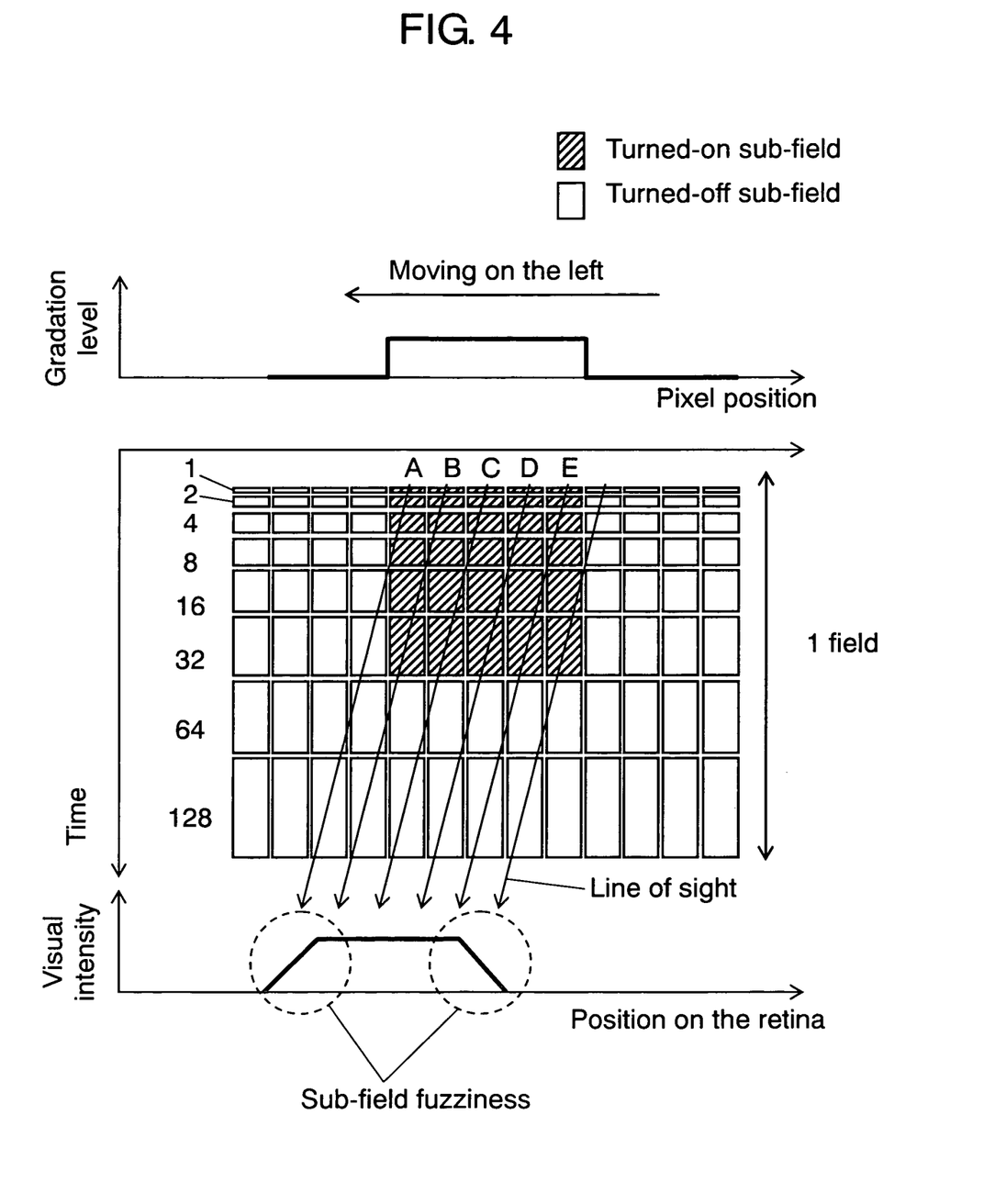
FIG. 4 shows a turned-on state of predetermined sub-fields in a motion picture display and distribution of visible intensity on the retina of the eyes when a viewer sees the motion picture.

Here will be described how the sub-field fuzziness occurs. FIG. 3 shows the turned-on state, with the passage of time, of the sub-fields arranged in the ascending coding of FIG. 1A, and distribution of visual intensity on the retina of human eyes. When pixels A through E represent gray level 63, as shown in FIG. 3, pixels A through E turn on at the sub-fields having weight of luminance of 1, 2, 4, 8, 16, and 32. When the screen shows a still picture, a viewer sees the picture with a line of sight that is fixed, and therefore the luminance generated by the sub-fields having the weights of 1, 2, 4, 8, 16, and 32 is accumulated onto a same position on the retina of the eyes. As a result, the viewer recognizes the image with a uniform visual intensity. On the other hand, when the screen shows a motion picture that is moving toward left, as shown in FIG. 4, the viewer's eyes follow the movement, moving the line of sight to the left. At this time, the luminance given from the sub-fields is diagonally accumulated on the retina, as shown in FIG. 4. This causes variations in visual intensity, providing the motion picture with a fuzzy edge, that is, inviting a poor resolution in the edge portion of motion pictures. This is the sub-field fuzziness mentioned above, which often occurs, regardless of the ascending coding, descending coding, or any other arrangements of the sub-fields, in an image display device employing the sub-field system.

When a viewer watches a motion picture shown on the display device, the motion picture and movement of the line of sight generally have a strong correlation; hereinafter the description will be given on the assumption that the line of sight follows the moving direction of the motion picture on the screen.

Figure 5:
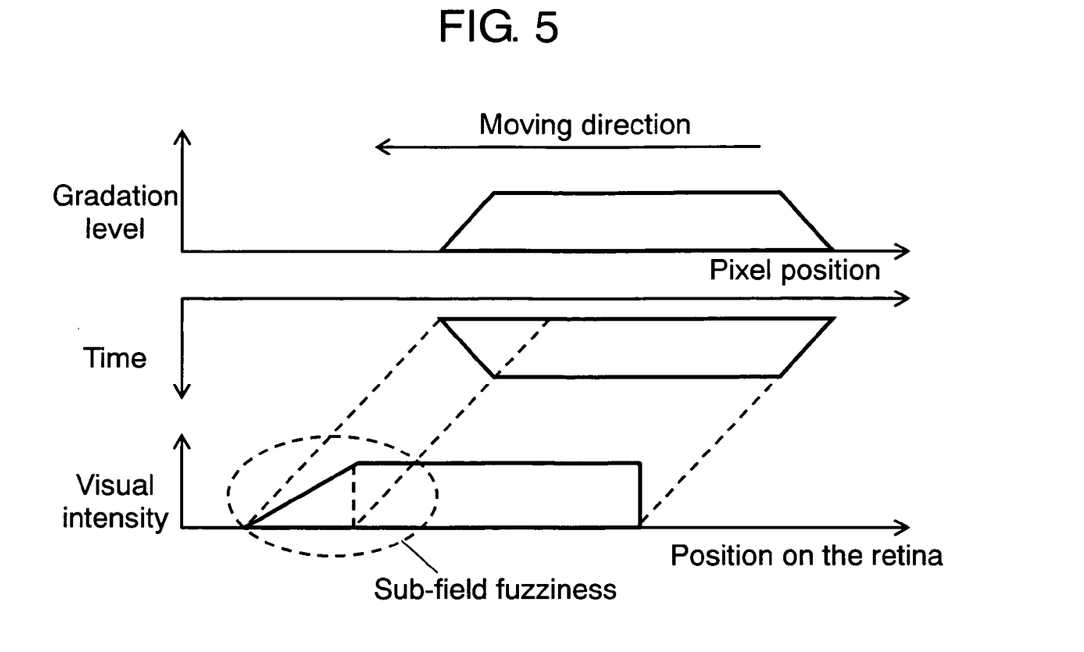
FIG. 5 illustrates fuzziness observed at an edge portion of a motion picture area when the sub-fields are arranged in an ascending coding.
Figure 6:
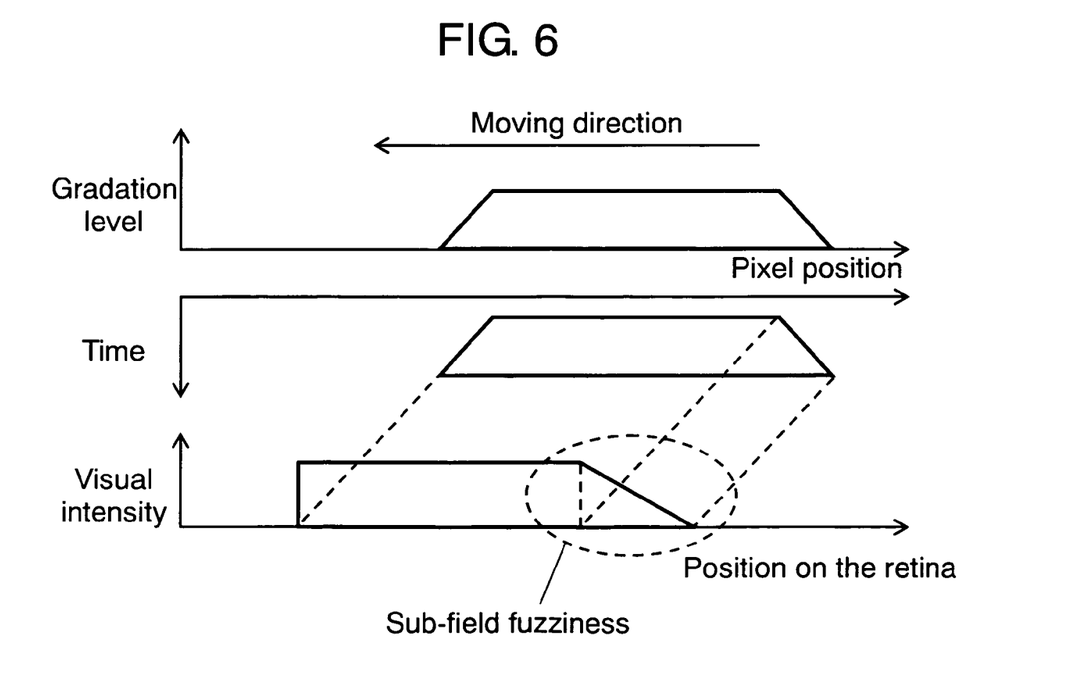
FIG. 6 illustrates fuzziness observed at an edge portion of a motion picture area when the sub-fields are arranged in a descending coding.

The sub-field fuzziness occurs, as described above, at a sharp edge portion in a display area. Actually, when a motion picture, for example, shot by a TV camera is shown on the screen, the edge portion of the motion picture area often becomes blurred. In this case, when the sub-fields are arranged in the ascending coding, as shown in FIG. 5, the sub-field fuzziness observed at an edge portion of the motion picture area on the side where the gradation level is reducing along the moving direction is noticeably getting worse, compared to the blurred edge of the original image. In contrast, when the sub-fields are arranged in the descending coding, as shown in FIG. 6, the sub-field fuzziness observed at an edge portion of the motion picture area on the side where the gradation level is increasing along the moving direction is noticeably getting worse, compared to the blurred edge of the original image. Furthermore, the sub-field fuzziness observed in the motion picture area is more conspicuous, when the edge portion of the original input image is badly blurred, or when the motion picture moves at a higher speed. Such a sub-field fuzziness persists regardless of the ascending coding, descending coding, or any other arrangements of the sub-fields.

In the noise reduction with the use of the aforementioned frame-cyclic noise reduction device, a blurred edge portion of a motion picture area has often amplified the sub-field fuzziness, resulting in deterioration in image quality.

The present invention addresses the problems above. It is therefore the object of the invention to provide an improved method and device of frame-cyclic noise reduction, which prevents the sub-field fuzziness from becoming worse and, at the same time, effectively reduces noise.

DISCLOSURE OF THE INVENTION

To achieve the object above, the present invention provides a frame-cyclic noise reduction method used for an image display device in which one field is divided into a plurality of sub-fields, and turned-on sub-fields are properly combined to provide image with gradation. The device employing the noise reduction method detects an area in which an image has a badly blurred edge portion, i.e., a serious sub-field fuzziness is expected, and determines a cyclic amount for the detected area to be different from that for other areas.

DETAILED DESCRIPTION OF CARRYING OUT OF THE INVENTION

An exemplary embodiment of the present invention is described hereinafter with reference to the accompanying drawings.

Exemplary Embodiment

Figure 7:
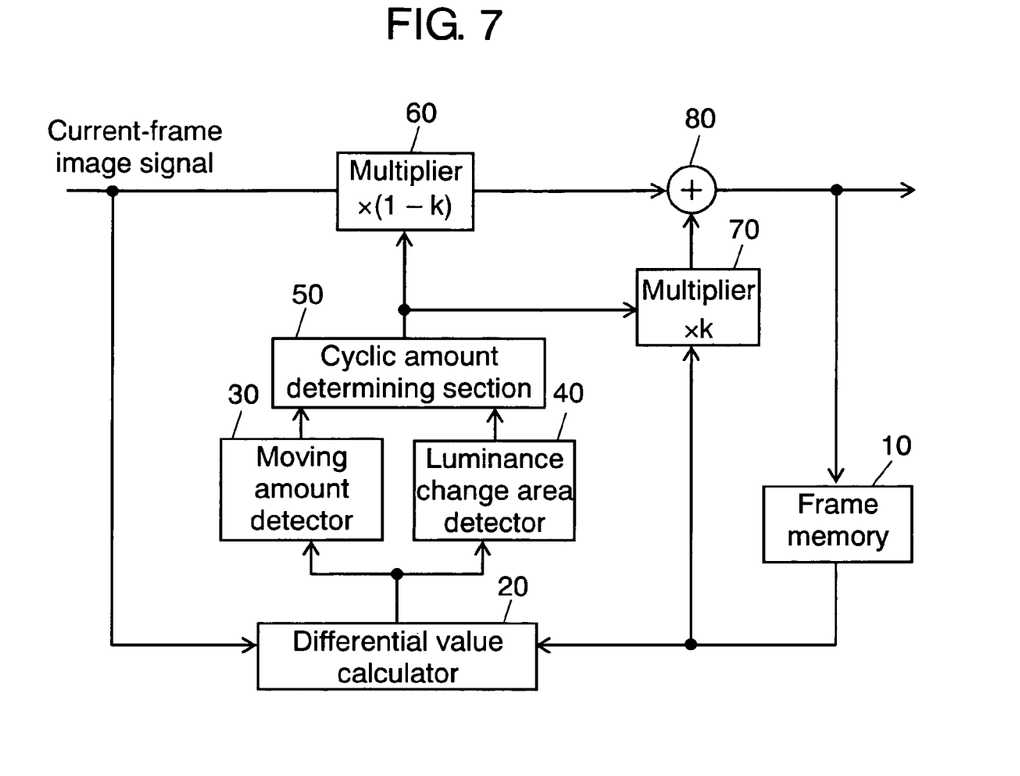
FIG. 7 is a circuit block diagram of a frame-cyclic noise reduction device of an embodiment of the present invention.

FIG. 7 is a circuit block diagram of a frame-cyclic noise reduction device of an embodiment of the present invention. The device contains frame memory 10; differential value calculator 20; movement (moving) amount detector 30; luminance change area detector 40; cyclic amount determining section 60; multipliers 60, 70; and adder 80.

Differential value calculator 20 calculates the difference between a current-frame image signal and a one-frame-before image signal, and then outputs the differential value as a differential signal to movement amount detector 30 and luminance change area detector 40. Receiving the differential signal, movement amount detector 30 determines a movement amount in a motion picture area of an image, and outputs the movement amount as a movement amount signal to cyclic amount determining section 50. On the other hand, luminance change area detector 40 detects an image area where the differential signal takes the positive sign, that is, the area in which a signal level decreases as an image moves (hereinafter referred to as a decreasing luminance change area) and an image area where the differential signal takes the negative sign, that is, the area in which the signal level increases as the image moves (hereinafter, increasing luminance change area). After detecting, luminance change area detector 40 selects either one of the decreasing luminance change area and the increasing luminance change area according to the arrangement of the sub-fields, and then outputs a luminance change signal corresponding to the selected change area to cyclic amount determining section 50.

According to the movement amount signal fed from detector 30 and the luminance change signal fed from detector 40, cyclic amount determining section 50 determines cyclic amount k and outputs it to multipliers 60 and 70. Cyclic amount k ($0 \leq k \leq 1$) represents the degree of time-averaging image signals by frame period. That is, when k takes 0, image signals have no time-averaging; when k takes a larger value, the degree of time-averaging become higher. The larger cyclic amount k, the higher effect of noise reduction is expected; but in contrast, the likelier sub-field fuzziness occurs.

Multiplier 60 multiplies an input image signal, i.e., the current-frame image signal by multiplier factor (1−k). Multiplier 70 multiplies the output from frame memory 10, i.e., the one-frame-before image signal by cyclic amount k. Adder 80 adds the outputs from multipliers 60 and 70 and outputs it as an output image signal. The output from adder 80 is stored in frame memory 10 for the process of the next frame.

Figure 8:
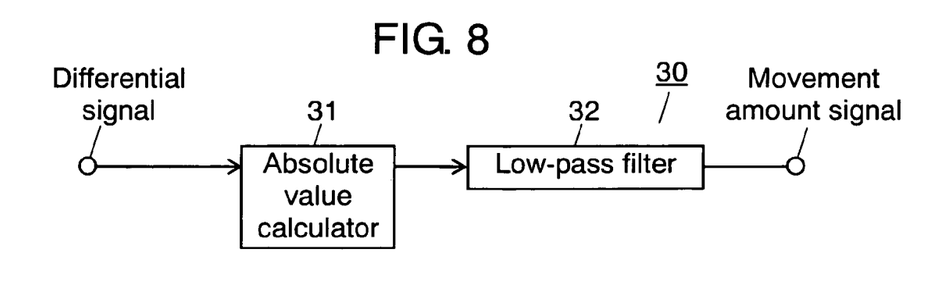
FIG. 8 is a circuit block diagram of a movement amount detector of the frame-cyclic noise reduction device.

FIG. 8 is a circuit block diagram of movement amount detector 30. Receiving a differential signal from differential value calculator 20, absolute value calculator 31 calculates the absolute value of the signal and outputs it as an absolute signal. Low-pass filter 32 provides the absolute signal with smoothing. The smoothing process suppresses noise included in the signal to prevent a movement amount from becoming too large due to the noise. For example, a median filter can be employed for the smoothing process.

Figure 9:
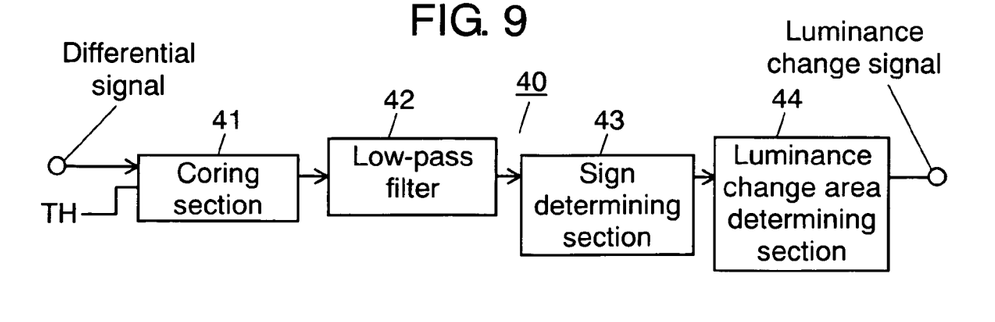
FIG. 9 is a circuit block diagram of a luminance change area detector of the frame-cyclic noise reduction device.
Figure 10:
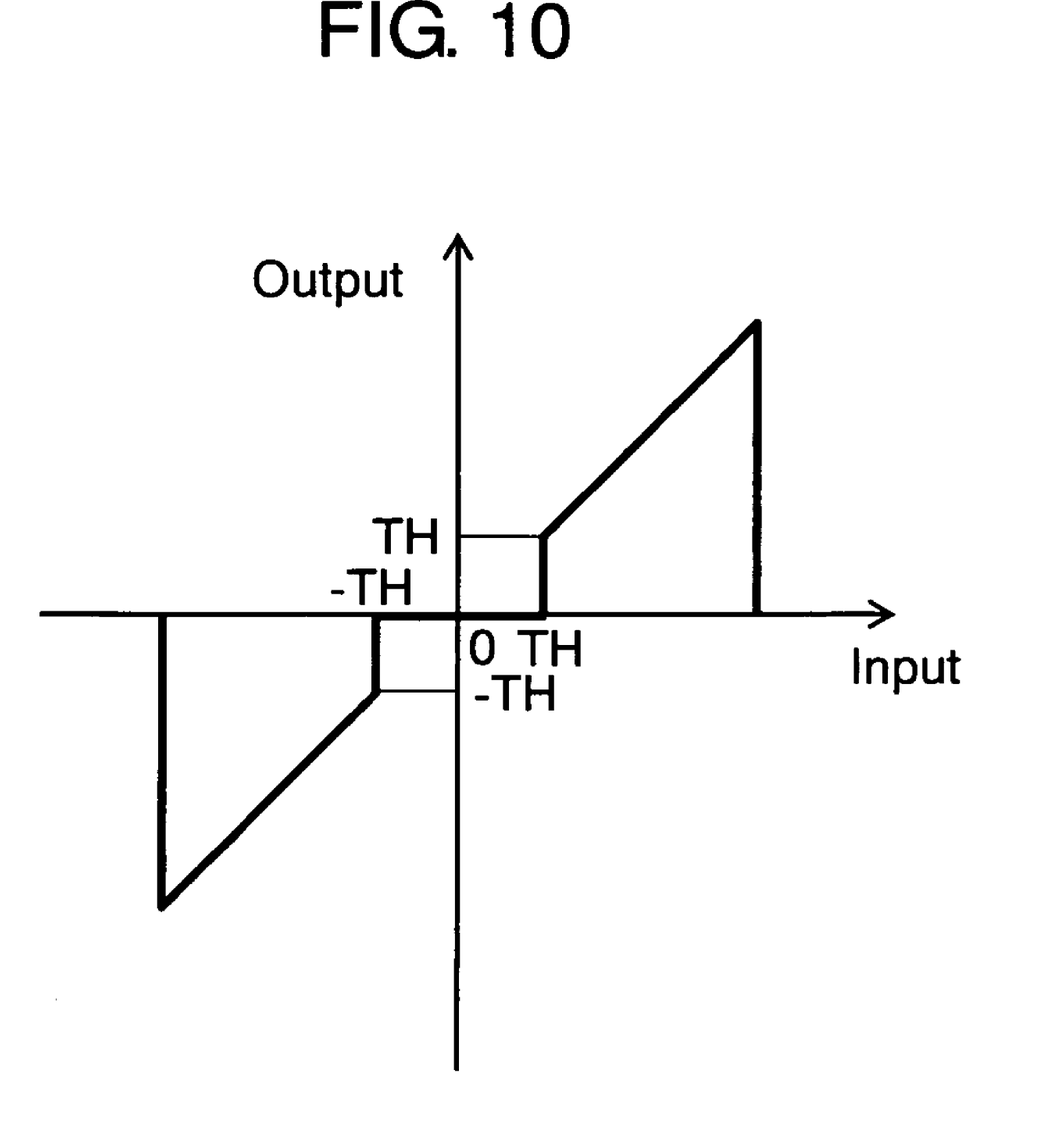
FIG. 10 shows input/output characteristics of the coring section of the frame-cyclic noise reduction device.

FIG. 9 is a circuit block diagram of luminance change area detector 40. Receiving the differential signal, luminance change area detector 40 detects an area in which sub-field fuzziness can become worse. Coring section 41 is responsible for cutting off noise in the differential signal. FIG. 10 shows characteristics of coring section 41. According to the amplitude of noise to be cut off, threshold TH is properly controlled.

Coring section 41 cuts off a low-amplitude component of the differential signal and passes it to low-pass filter 42. Receiving the signal, low-pass filter 42 provides it with the smoothing process. Low-pass filter 42 is disposed so that the luminance change area to be detected with a margin on the greater side. Sign determining section 43 detects the sign of the smoothing-processed signal and outputs it as a sign signal to luminance change area determining section 44. Receiving the sign signal, luminance change area determining section 44 determines, according to the arrangement of the sub-fields, an area in which sub-field fuzziness can become worse, and outputs the result as a luminance change signal to cyclic amount determining section 50.

Figure 11A:
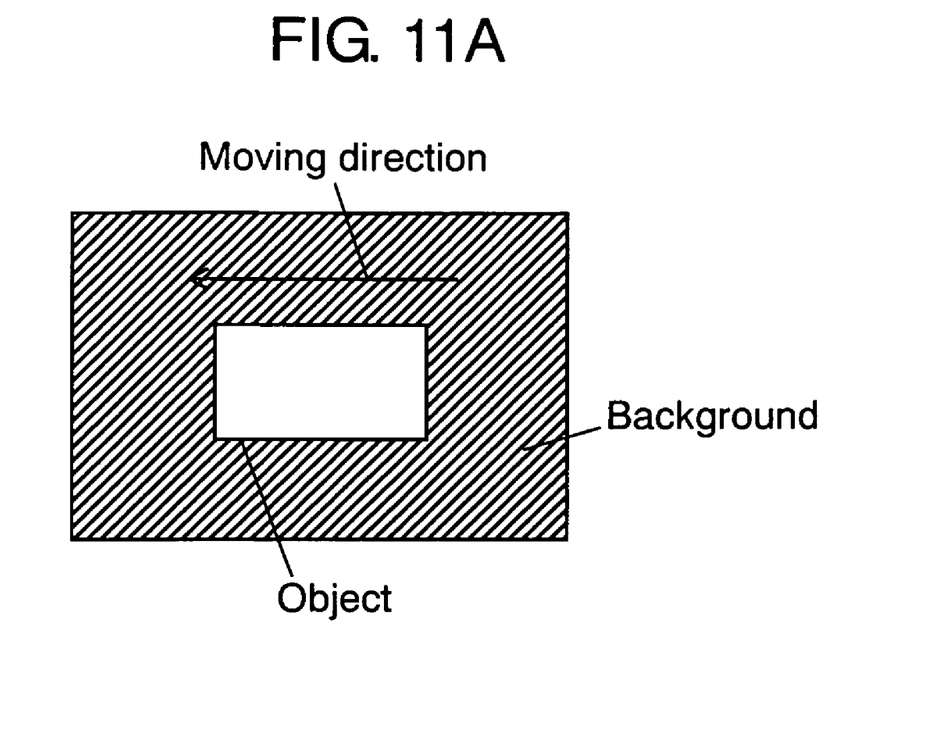
FIG. 11 shows an example of an input image.
Figure 12:
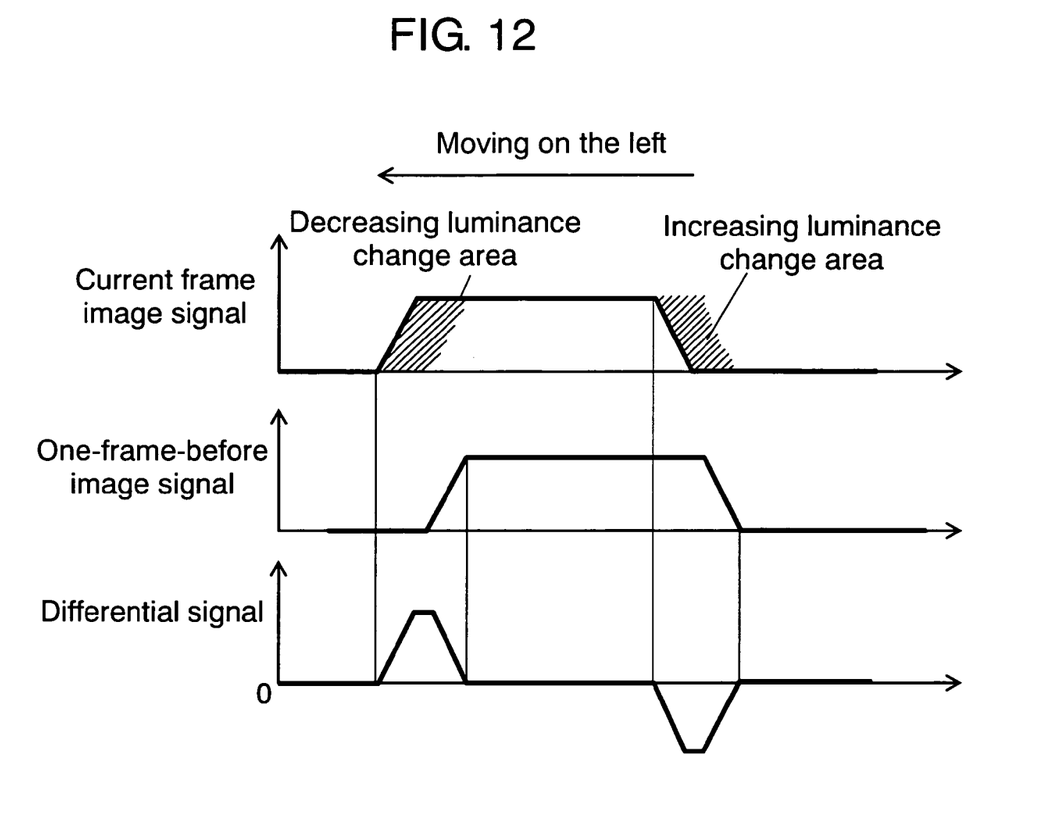
FIG. 12 shows signals fed from each section of the device in response to an input image signal.

Next will be specifically described how luminance change area detector 40 works with reference to a motion picture as an example. FIGS. 11A and 11B show an input image. For example, FIG. 11A shows a motion picture in which a bright object (the signal level is not zero) moves on the left against a dark background (the signal level is zero). FIG. 12 shows the signals for one line at each section of the frame-cyclic noise reduction device of the embodiment when the input image of FIG. 11A, for example, comes into the device; more specifically, they are a current-frame image signal; a one-frame-before image signal, and a differential signal that represents difference between the current-frame image signal and the one-frame-before image signal. The diagonally shaded areas in FIG. 12 are the area in which the differential signal takes the positive sign, i.e., the decreasing luminance change area in which the signal level decreases as an image moves; and the differential signal takes the negative sign, i.e., the increasing luminance change area in which the signal level increases as an image moves.

When the sub-fields are arranged in the ascending coding, luminance change area determining section 44 determines the area in which the differential signal takes the positive sign—the decreasing luminance change area—to be the area where sub-field fuzziness becomes worse, and then outputs the luminance change signal corresponding to the area. On the other hand, when the sub-fields are arranged in the descending coding, luminance change area determining section 44 determines the area in which the differential signal takes the negative sign—the increasing luminance change area—to be the area where sub-field fuzziness becomes worse.

Figure 11B:
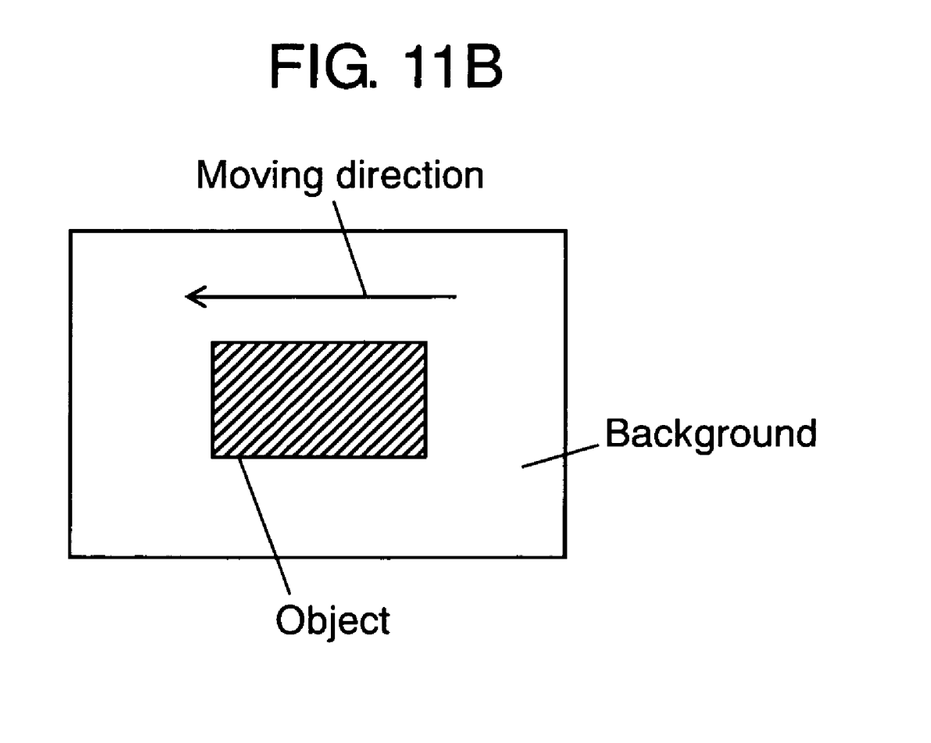
Figure 13:
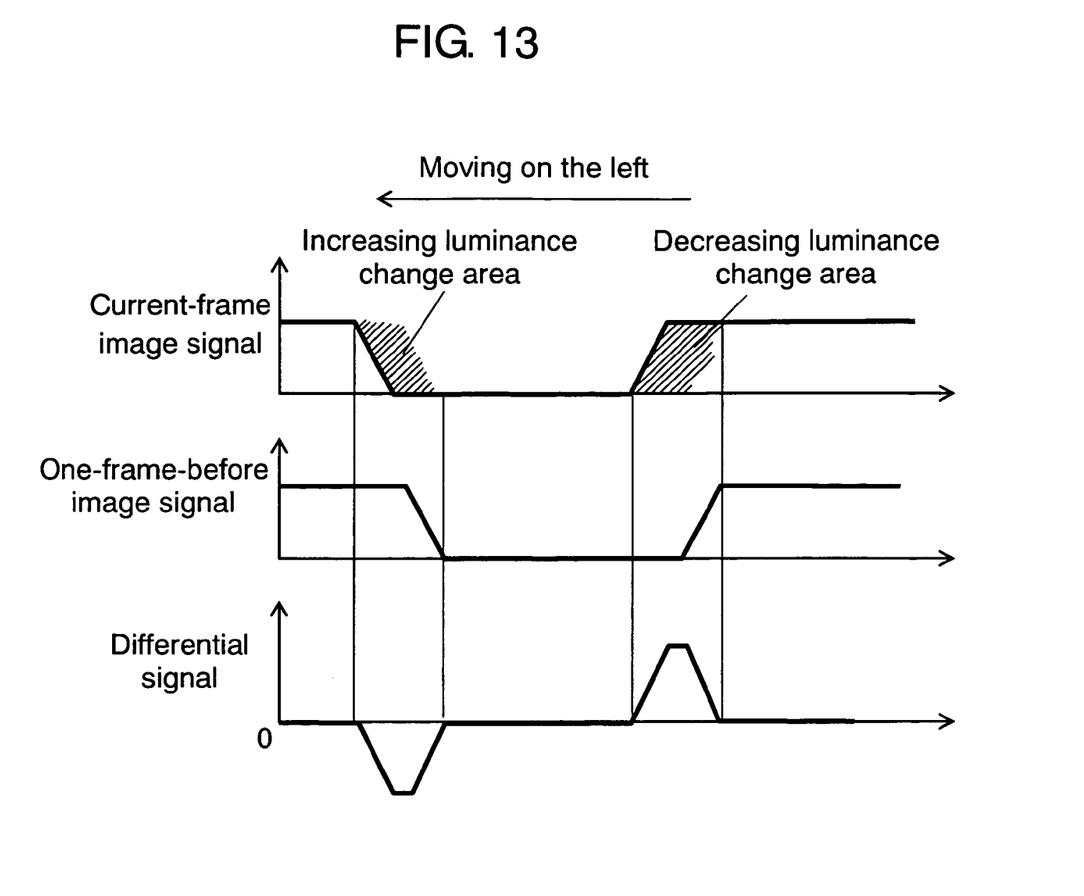
FIG. 13 shows signals at each section of the device in response to an input image signal.

When the influence of noise is counted out, still pictures have a strong autocorrelation between frames, as described earlier. The area in which the differential signal is not zero is the area having movement of images, i.e., the area where sub-field fuzziness can become worse. Furthermore, judging from the sign that the differential signal takes, the device determines the area in which sub-field fuzziness can become worse. When receiving the input image, as shown in FIG. 11B, in which a dark object moves against a bright background, the device enables to detect, from the differential signal and its sign, an area in which sub-field fuzziness can become worse. FIG. 13 shows the signals for one line at each section of the frame-cyclic noise reduction device of the embodiment when the input image of FIG. 11B comes into the device.

The arrangement of sub-fields is not limited to the ascending coding or the descending coding. Therefore, both the decreasing luminance change area and the increasing luminance change area can be counted in the luminance change area where sub-field fuzziness becomes worse.

Figure 14:
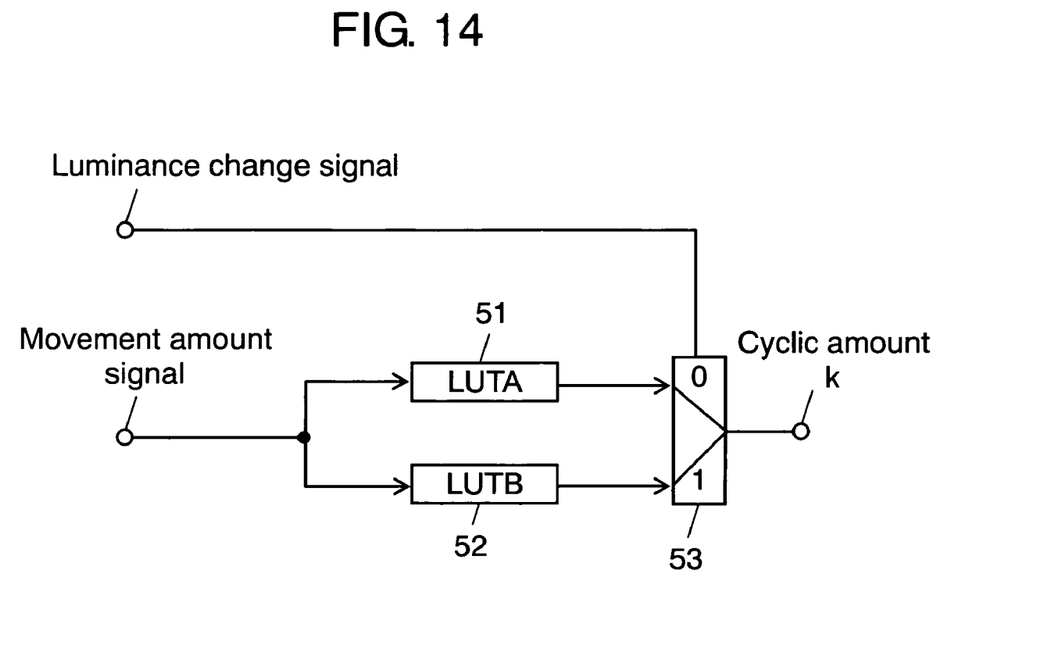
FIG. 14 is a circuit block diagram of a cyclic amount determining section of the frame-cyclic noise reduction device.
Figure 15:
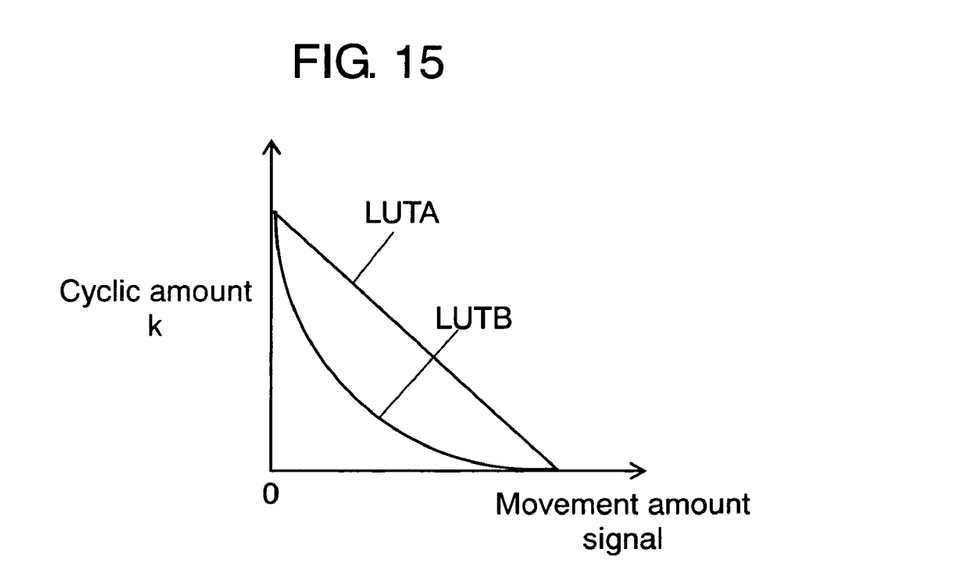
FIG. 15 shows the relation between a movement amount and a cyclic amount of the frame-cyclic noise reduction device.

Next will be described the structure and workings of cyclic amount determining section 50. In conventional frame-cyclic noise reduction, cyclic amount k is determined according to the magnitude of a movement amount. According to cyclic amount determining section 50 of the embodiment, cyclic amount k is also determined in a manner that cyclic amount k decreases as the movement amount increases. However, the noise reduction of the embodiment differs from the conventional method in that the target area in which sub-field fuzziness can become worse is detected by the luminance change signal, and the cyclic amount for the target area is differently defined from that for other areas. FIG. 14 is a circuit block diagram of cyclic amount determining section 50. Cyclic amount determining section 50 has translation tables LUTA 51 and LUTB 52, and selector 53. LUTA 51 and LUTB 52 are the movement-to-cyclic amount translation tables for areas other than the luminance change area, and for the luminance change area, respectively. Selector 53 selects one of the outputs from LUTA 51 and LUTB 52 according to the luminance change signal. FIG. 15 shows the characteristics of translation tables LUTA 51 and LUTB 52. When detecting the image signal that represents the luminance change area, selector 53 finds a cyclic amount from LUTB 52; otherwise, finds a cyclic amount from LUTA 51, and outputs the cyclic amount as cyclic amount signal k.

Figure 16:
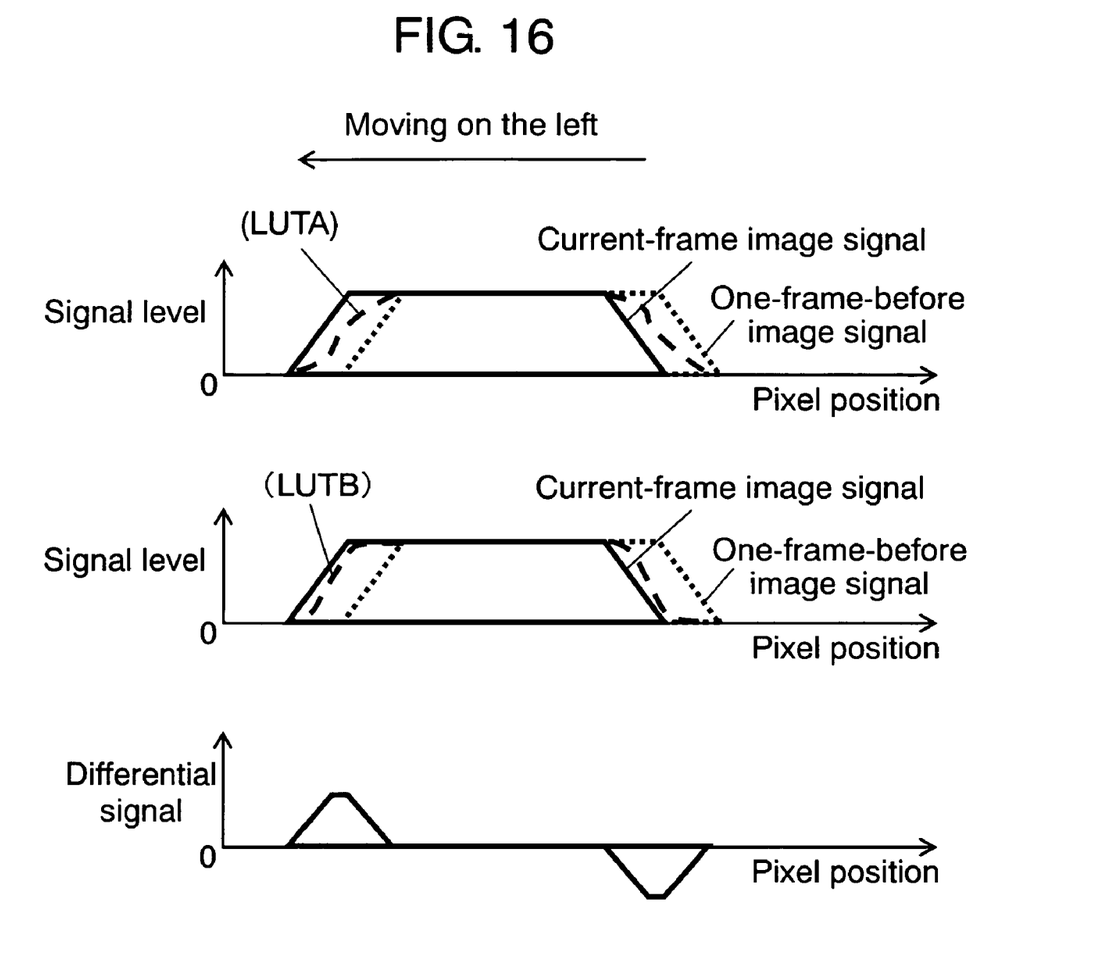
FIG. 16 shows signals at each section of the device in response to an input image signal.

FIG. 16 shows the signals for one line at each section of the device of the embodiment when the input image shown in FIG. 11A. The signals are a current-frame image signal, a one-frame-before image signal, and a differential signal corresponding to the motion picture, where a bright object moves on the left against a dark background and, at the edge portion, sub-field fuzziness occurs. In FIG. 16, the broken line indicated by (LUTA) represents the image signal that has undergone frame-cyclic noise reduction using table LUTA; similarly, the broken line indicated by (LUTB) represents the image signal processed using table LUTB.

When the sub-fields are arranged in the ascending coding, the area in which sub-field fuzziness can become worse, i.e., the luminance change area is the left-side edge portion where the differential signal takes the positive sign. To avoid sub-field fuzziness from becoming worse, the left-side edge portion needs to have a sharp edge. The device determines cyclic amount k for the luminance change area to be smaller than that for other areas. The cyclic amounts given from table LUTB is, as shown in FIG. 15, smaller than those from table LUTA. Therefore, cyclic amount determining section 50 selects table LUTB when receiving an image signal corresponding to the luminance change area; otherwise, selects table LUTA.

As for the area where sub-field fuzziness can become worse, the device of the embodiment, as described above, determines the cyclic amount to be smaller, thereby preventing image quality from being deteriorated. On the other hand, as for other areas, the device determines the cyclic amount to be larger, thereby providing sufficient noise reduction effect.

Although the embodiment introduces two translation tables having different characteristics shown in FIG. 15, the cyclic amount is necessarily determined by them; determining the cyclic amount for the luminance change area to be equal to, or smaller than that for other areas can obtain the same effect.

The noise reduction device of the embodiment detects an area in which sub-field fuzziness can become worse as the luminance change area and controls cyclic amount k corresponding to movement in the image, thereby suppressing the sub-field fuzziness in the area. In this way, the device can suppresses sub-field fuzziness in the luminance change area; on the other hand, the device can maintain a sufficient noise reduction effect in other areas.

The present invention can thus provide a method and device capable of not only preventing sub-field fuzziness from becoming worse, but also decreasing noise.

The frame-cyclic noise reduction method and device of the present invention can not only prevent sub-field fuzziness from becoming worse, but also decreasing noise. The method and device is effective in applying for an image display device in which one field is divided into a plurality of sub-fields and turned-on sub-fields are properly combined to provide image with gradation.

The invention claimed is:

1. A frame-cyclic noise reduction method employed for an image display device in which one field is divided into a plurality of sub-fields, each sub-field having a predetermined weight of luminance, and in which turned-on sub-fields are properly combined to provide an image with gradation, the frame-cyclic noise reduction method comprising:
that is, where sub-field fuzziness becomes worse; and controlling a cyclic amount for the area in which the sub-field fuzziness becomes worse to be different from a cyclic amount for other areas,
wherein a movement amount is detected according to a differential signal calculated as a difference between a current-frame image signal and a one-frame-before image signal, and the cyclic amount is decreased as the movement amount increases in the area where the sub-field fuzziness becomes worse or in the other areas, and
wherein a cyclic amount corresponding to a movement amount in the area where the sub-field fuzziness becomes worse is determined to be equal to, or to be smaller than the cyclic amount for areas other than the area where the sub-field fuzziness becomes worse.

2. A frame-cyclic noise reduction method employed for an image display device in which one field is divided into a plurality of sub-fields, each sub-field having a predetermined weight of luminance, and in which turned-on sub-fields are properly combined to provide an image with gradation, the frame-cyclic noise reduction method comprising:
detecting an area where an edge portion of an image becomes unclear, that is, where sub-field fuzziness becomes worse; and
controlling a cyclic amount for the area in which the sub-field fuzziness becomes worse to be different from a cyclic amount for other areas,
wherein the area where the sub-field fuzziness becomes worse is included in an area in which an image signal level decreases along a moving direction of an image when the sub-fields constituting the one field are arranged in an ascending order of weight of luminance, whereas the area where the sub-field fuzziness becomes worse is included in an area in which an image signal level increases along a moving direction of an image when the sub-fields constituting the one field are arranged in a descending order of weight of luminance.

3. A frame-cyclic noise reduction device employed for an image display device in which one field is divided into a plurality of sub-fields, each sub-field having a predetermined weight of luminance, and in which turned-on sub-fields are properly combined to provide an image with gradation, the frame-cyclic noise reduction device comprising:
a luminance change area detector for detecting an area where an edge portion of an image becomes unclear, that is, where sub-field fuzziness becomes worse;
a movement amount detector for detecting a movement amount of an image according to a differential signal calculated as a difference between a current-frame image signal and a one-frame-before image signal; and
a cyclic amount determining section for determining a cyclic amount according to outputs from the luminance change area detector and the movement amount detector,
wherein, the cyclic amount determining section contains at least two translation tables for translating from the movement amount to the cyclic amount, and selects one translation table from the translation tables according to the output from the luminance change area detector.

* * * * *